US008839579B2

(12) United States Patent
Lakoduk (10) Patent No.: US 8,839,579 B2
(45) Date of Patent: *Sep. 23, 2014

(54) REMODELING CABLE PROTECTING PLATE (71) Applicant: Everett L. Lakoduk, San Jose, CA (US)

(72) Inventor: Everett L. Lakoduk, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/025,102

(22) Filed: Sep. 12, 2013

(65) Prior Publication Data

US 2014/0007542 A1   Jan. 9, 2014

Related U.S. Application Data (63) Continuation-in-part of application No. 12/430,078, filed on Apr. 25, 2009, now Pat. No. 8,544,225.

(51) Int. Cl.
E04C 2/52 (2006.01)
H02G 3/00 (2006.01)
H02G 3/12 (2006.01)
E04F 13/074 (2006.01)

(52) U.S. Cl.
CPC ............ *E04F 13/074* (2013.01); *H02G 3/26* (2013.01); *H02G 3/12* (2013.01)
USPC .......................... 52/220.1; 52/699

(58) Field of Classification Search
CPC .. H02G 3/286; H02G 1/00; E04B 2002/7488; E04C 3/07
USPC ............ 52/220.7, 220.1, 220.5, 317, 717.06, 52/699; 174/135, 507
See application file for complete search history.

(56) References Cited

U.S. PATENT DOCUMENTS

| 3,211,824 | A |   | 10/1965 | Heiman |
|---|---|---|---|---|
| 3,211,825 | A | * | 10/1965 | Clos ............................... 174/507 |
| 3,240,869 | A |   | 3/1966 | Juriet |
| 3,297,815 | A |   | 1/1967 | Drettmann |
| 3,350,501 | A |   | 10/1967 | Jureit |
| 3,553,346 | A |   | 1/1971 | Ballantyne |
| 3,689,681 | A |   | 9/1972 | Searer |
| 4,050,205 | A | * | 9/1977 | Ligda .............................. 52/357 |
| 4,800,696 | A | * | 1/1989 | Miller et al. .................. 174/495 |
| 4,807,417 | A |   | 2/1989 | Bell |

(Continued)

FOREIGN PATENT DOCUMENTS

| CA | 1096412 | 2/1981 |
|---|---|---|
| CA | 1142729 | 3/1983 |

OTHER PUBLICATIONS

Press-on Nail Plate.

*Primary Examiner* — Branon Painter
(74) *Attorney, Agent, or Firm* — Jon Fallon, Esq.; Michael P. Kochka, Esq.

(57) ABSTRACT

A framing construction system is provided that may comprise a cable protecting plate comprising non-metallic material, an upper convex surface, a lower concave surface, a first side edge, a second side edge, a first end, and a second end; an opening provided in wallboard; wherein the protecting plate is substantially rectangular in shape and inserted within the opening in the wallboard, with the lower concave surface being placed over a service line positioned across a structural support to prevent typical fasteners from penetrating the service line; and wherein the protecting plate is pivoted around the structural support and the upper convex surface of the protecting plate resting against an inside surface of the wallboard to secure by tension the protecting plate in the opening in the wallboard.

20 Claims, 5 Drawing Sheets (56) References Cited

U.S. PATENT DOCUMENTS

| | | |
|---|---|---|
| 4,924,646 A | 5/1990 | Marquardt |
| 5,163,254 A | 11/1992 | Zastrow |
| 5,359,151 A | 10/1994 | Nattel et al. |
| 5,960,603 A | 10/1999 | Redden |
| 6,061,910 A | 5/2000 | Williamson |
| 6,262,373 B1 * | 7/2001 | Dagley et al. ............... 174/73.1 |
| 6,479,749 B1 | 11/2002 | Vrame |
| 6,642,445 B1 | 11/2003 | Lalancette |
| 6,935,079 B1 | 8/2005 | Julian et al. |
| 7,601,918 B2 | 10/2009 | Pamperin |
| 8,544,225 B2 * | 10/2013 | Lakoduk .................... 52/220.1 |
| 2003/0126824 A1 | 7/2003 | Jensen |
| 2007/0169820 A1 * | 7/2007 | Pamperin .................... 137/343 |
| 2009/0020329 A1 * | 1/2009 | Frenkel ....................... 174/507 |
| 2010/0270072 A1 * | 10/2010 | Frenkel ....................... 174/507 |

* cited by examiner

REMODELING CABLE PROTECTING PLATE

CROSS-REFERENCE TO RELATED APPLICATIONS

This application is a continuation-in-part of U.S. patent application Ser. No. 12/430,078, filed Apr. 25, 2009, entitled "Remodeling Cable Protecting Plate," the disclosure of which is incorporated by reference herein in its entirety.

BACKGROUND

1. Field of the Invention

Embodiments of the present invention generally relate to a framing construction system. More specifically, embodiments of the present disclosure relate to a framing construction system that may comprise a cable protecting plate comprising non-metallic material, an upper convex surface, and a lower concave surface.

2. Description of the Related Art

Service lines are used for many purposes in both residential and commercial construction. They include but are not limited to: high voltage cables, low voltage cables, fiber optical, water tubing and gas tubing. Some service lines are somewhat flexible, allowing for ease of installation. One example of a flexible service line is a manifold water system used in climates where freezing occurs. These systems rely upon flexible plastic tubing that resist expansion and are less susceptible to breaking during a deep freeze weather event than rigid pipes. Some gas lines are flexible and can be installed in walls and in service access areas, complete with engineered fittings. In installing these service lines, it is often assumed that structural members will be accessible and that installation areas relatively open.

Cable protecting plates are used to prevent the inadvertent penetration of wires, pipes, tubing, and service lines, by fasteners such as nails and screws in construction. These plates have a variety of shapes depending upon the framing function (bearing wall, partition wall, furring wall) and construction material (wood, metal and thin strips for furring). These plates are not suited for remodeling when the wall covering is already installed and will remain installed everywhere with exception of the reasonably immediate local of the actual protecting plate.

Many cable protecting plates have features which will damage the wires they are intended to protect. Many devices incorporate integral attachment provisions, typically in some form of integral teeth. The existence and the placement of these "teeth" render these protective plates potentially destructive to the very service line they are to protect if they are used in parallel to the service lines.

In order to overcome the above mentioned disadvantages, embodiments of the present invention provide for a protective plate that may comprise metallic and/or non-metallic materials of a rust resistant type in an elongated rectangular shape.

SUMMARY

Embodiments of the present invention relate to the manufacture of a metal or non-metal article for use in wood frame construction and light metal frame construction. This present invention relates particularly to a plate, which may be stamped metal and/or non-metal, having an improved shape rendering it useful in a remodeling application.

In one embodiment of the present invention, a framing construction system may comprise a cable protecting plate comprising non-metallic material, an upper convex surface, a lower concave surface, a first side edge, a second side edge, a first end, and a second end; an opening provided in wallboard; wherein the protecting plate is substantially rectangular in shape and inserted within the opening in the wallboard, with the lower concave surface being placed over a service line positioned across a structural support to prevent typical fasteners from penetrating the service line; and wherein the protecting plate is pivoted around the structural support and the upper convex surface of the protecting plate resting against an inside surface of the wallboard to secure by tension the protecting plate in the opening in the wallboard.

In another embodiment of the present invention, A framing construction system for protection of electrical wires may comprise a plate comprising non-metallic material, the plate having a first end spaced apart from a second end, a concave surface, and an edge; an opening formed in wallboard exposing a portion of a structural support and electrical wires; wherein the protecting plate is pivoted around the structural support and the first and second ends of the protecting plate rest against an inside surface of the wallboard to secure the protecting plate in the opening in the wallboard; and wherein the concave surface rests along an electrical wire extended over the structural support inhibiting penetration of a wall fastener and shielding the electrical wire from damage.

BRIEF DESCRIPTION OF THE DRAWINGS

So the manner in which the above recited features of the present disclosure can be understood in detail, a more particular description of embodiments of the present disclosure, briefly summarized above, may be had by reference to embodiments, which are illustrated in the appended drawings. It is to be noted, however, the appended drawings illustrate only typical embodiments of embodiments encompassed within the scope of the present disclosure, and, therefore, are not to be considered limiting, for the present disclosure may admit to other equally effective embodiments, wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate

DETAILED DESCRIPTION

Embodiments of the present invention generally relate to a framing construction system. More specifically, embodiments of the present disclosure relate to a framing construction system that may comprise a cable protecting plate comprising non-metallic material, an upper convex surface, and a lower concave surface.

Embodiments of the present invention may pertain to the application of flexible products in a retrofit or remodeling application, wherein wallboard, such as drywall or plaster is already in place and may substantially remain so. Because of the nature of typical frame construction, there may be a void created between each of a plurality of structural members. The process of gaining access to this void for the purpose of concealing new service lines is improved with embodiments of the present invention.

Methods of installation in accordance with the present invention may be less invasive than would be necessary with the installation of rigid materials. Because some service lines are flexible, there may not be a need to remove large sections of wallboard to gain access to the void between structural members as the service lines can be "snaked" through these voids in any number of ways with relative ease. These methods may involve a technique that will bring the new flexible product "over" the structural member, either by simply placing it on top of the structural member or by notching the same member within the acceptable parameters set forth by various building codes.

Embodiments of the present invention may protect a flexible service line with a protective plate that may prevent it from being inadvertently punctured either during the installation process or afterward when a fastener is required. Service lines may be substantially at the surface of a wallboard, that is that they progress from being roughly at center of the void while traversing the void, to then being just below the surface of the wallboard when passing over the structural member. In some embodiments, the service line may need a substantially large surface of protection. Some service lines may be installed through an access hole in the wallboard roughly the size of the hammer head that created it. In some embodiments, a protective plate may be installed parallel with the service line so as to also aid in the repair of the wallboard by backing the small hole created in it to gain access to the void between the structural members.

Given the need for the protective plate to parallel the service line, the existence and placement of "teeth" may render these protective plates potentially destructive to the very service line they are to protect if they are used in parallel to the service lines. In order to overcome the above mentioned disadvantages, the present invention provides for a metallic and/or non-metallic protective plate that may comprise a rust-resistant material in an elongated rectangular shape.

Upon installation, a device in accordance with embodiments of the present invention may have a bend in it from the center to each end in the flat surface. This bend may be formed either in the manufacturing process by some form of stamping procedure, it may be formed on site at the time of installation by the installer, and/or the like. If the bend is formed on site at the time of installation, the material may be light enough to avoid excess strain by the installer, but still adequate for the task of preventing puncture by the fastener. Whether the bend is done on site or in a factory may depend upon the perceived value of it being bent in advance. In some embodiments, it may be beneficial to have the bend done at the time of manufacture to insure a proper degree and for the convenience and health of the installer, as the installer may need to bend as many as two hundred plates on a small to medium size project.

Figure 8:
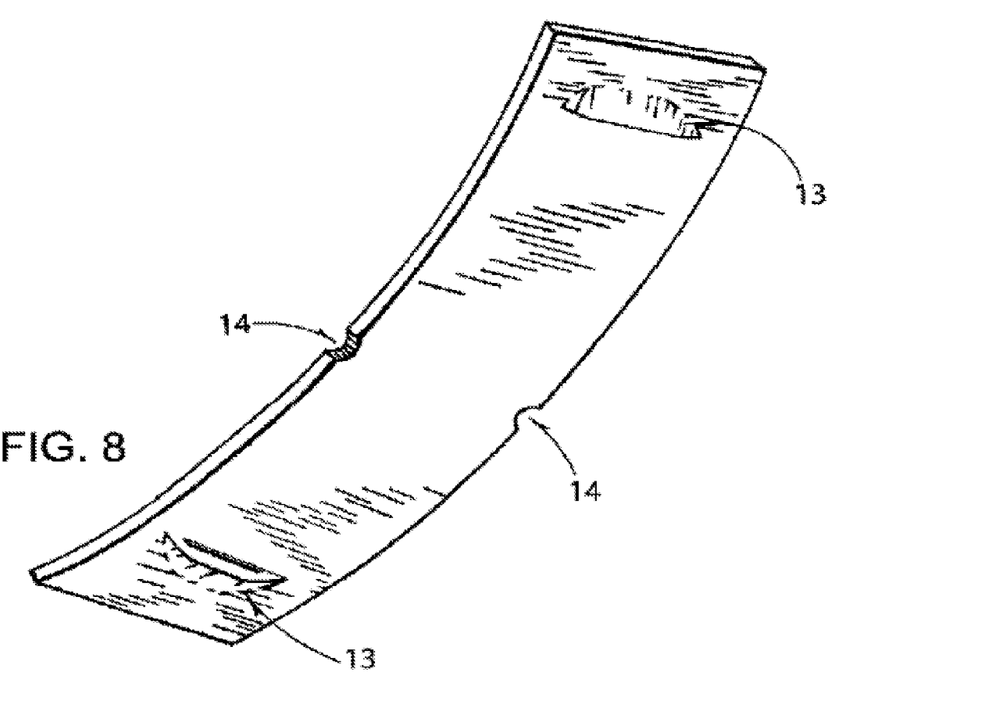
FIG. 8. is a perspective view of a plate, in accordance with embodiments of the present invention.

Regarding the shape of the bend, an exemplary sweeping arch, such as the arch shown in FIG. 8, may be included in the plate. In some embodiments, a bend may comprise an angular form, which may be the case if the plate is bent on site by the installer from a flat plate with no contour of any kind. Regardless of the nuances of the bend in the plate, the plate may be of a suitable thickness so as to prevent a fastener from easily piercing it and may be struck in a direction so as to prevent any sharp edges in the striking process from being on the concave surface, that is, the surface that faces away from the service lines. Additionally, a plate in accordance with embodiments of the present invention may comprise two raised areas at each end rising up on the surface opposite of the service lines for the purpose of aiding in installation with a tool such as a chisel. These raised surfaces may be raised high enough for such a tool to catch but not enough for a fastener to easily enter.

A plate in accordance with embodiments of the present invention may be secured without fasteners due to its shape and three points of tension caused by being disposed over a framing member and under each end of an existing wallboard. However, securing the plate without fasteners may not be desirable. To that end, the plate may also comprise one or more indentations at the center point indicating desired nail placement. These indentations may aid in keeping the plate firmly under the head of a common nail, as the nature of a nail or fastener driven alongside of a ridged metal plate may be to push the plate aside, which may render a nail a potential threat to the service lines. In some embodiments, these nail indication notches may serve as an indication to the installer that another step may be needed to ensure due diligence has been met.

The nails which keep the plate attached to the framing member may also serve to keep the service lines under the protective plate. Additionally, the nails may aid the installer in setting and maintaining the plate at a level below the surface of the wallboard. In some embodiments, when the plate is securely in place with two nails and the service lines are securely retained between the nails and under the nail plate, and the nail plate has been set at a level just below the aggregate surface level of the wallboard around it, the plate may form a structural repair of the wallboard. In some embodiments, the plate may be covered with a multi-purpose wallboard compound, for example, a compound commonly referred in the trade as "mud".

Service lines may be added to a wall or ceiling by removing areas of wallboard (sometimes known as drywall or plaster), either in long strips or entirely, then drilling holes in the framing members, thereby passing cables through the member and reinstalling wallboard. In exemplary embodiments of the present invention, a series of small penetrations may be made in a wallboard at each point where new service lines may intersect an existing framing member in order to gain access to the wall's interior space or the "void." Service lines may be installed in accordance with exemplary embodiments by bringing them out of the wallboard, crossing over the framing member, and reinserting them back into the void. This process may be referred to as "lacing." In some embodiments, the lacing process may be repeated as needed. The service lines may rest on top of and intersect a framing member and a plate may rest on top of the service lines and intersect the member.

In some embodiments of the present invention, when installing a remodeling cable protecting plate, a chisel may be gently hammered into a plate's chisel grip. Due to its nuanced shape and/or the chisel hammering, the plate may position snugly with a low risk of damaging the service lines. In some embodiments, two or more nails may be installed and may capture the service lines and keep them under the plate. In some embodiments, the two or more nails may set the plate to a depth below the surface of the existing wallboard making for a fast and imperceptible repair. In some embodiments, the plate may be set slightly below the surface of the existing wallboard.

By installing this remodeling cable protecting plate at each point where the penetrations occurred, the service lines may be simultaneously protected from future accidental puncture and securely fastened, both of which may be required by universal building codes. In some embodiments, wall voids created to gain access to the wall interior void may be covered, making a backing for a repair using a wallboard compound.

Figure 1:
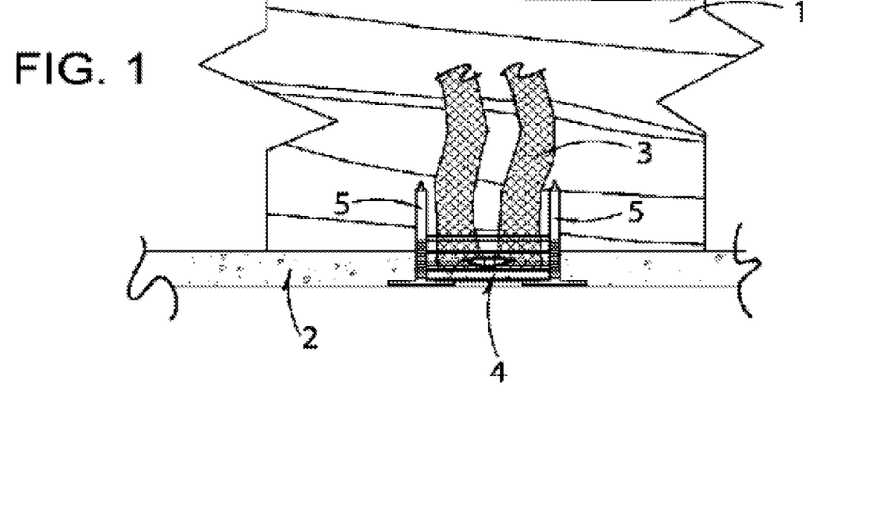
FIG. 1 is an end view of an exemplary plate covering service lines after installation, in accordance with embodiments of the present invention.

FIG. 1 is an end view showing a lateral view of a framing member 1 with wallboard 2 over it in accordance with embodiments of the present invention. In some embodiments, two service lines 3 under the plate 4 shown as an end view. Nails 5 may hold the plate in place and keep the service lines under the plate.

Figure 2:
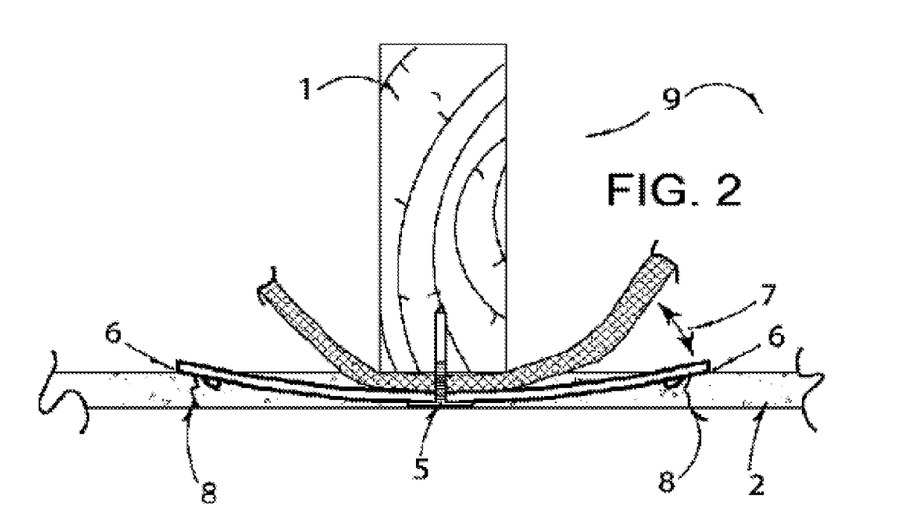
FIG. 2. is a side view of the plate shown in FIG. 1, in accordance with embodiments of the present invention.

FIG. 2. is a side view of the plate shown in FIG. 1 in accordance with embodiments of the present invention. A plate may rest on top of the inside surface of a wallboard 6 when it is installed, and may be disposed inside the boundaries of the access holes 8. A space 7 may exist between the end of the plate and the service line which may keep the extended parts of the service line well into the void 9 between structural members 1. In some embodiments, nails 5 may fix a plate in place at a level below the surface of the wallboard 2. In some embodiments, the nails 5 may fix a plate in place just below the surface of the wallboard 2.

Figure 3:
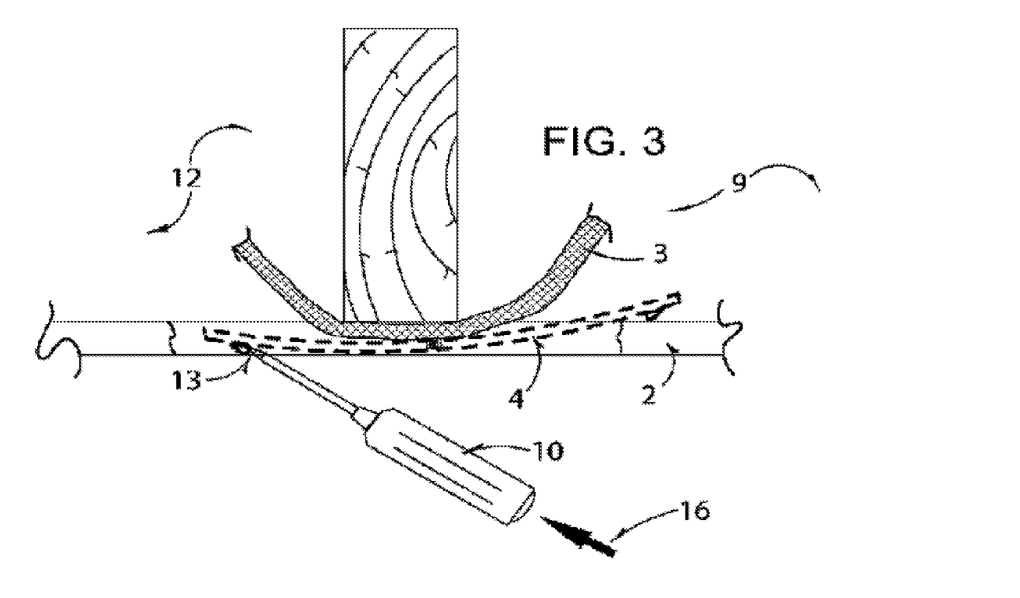
FIG. 3. is a side view of a plate showing the plate being installed, in accordance with embodiments of the present invention.

FIG. 3. is a side view of the plate 4 (the hash line indicates the plate is in motion, the arrow 16 indicates the direction of motion), as it is being installed over the service line, just before it has been pushed up into the void 9 space using a tool such as a chisel 10, in accordance with exemplary embodiments. A tool may be kept securely in place and may not slip into the void, but may instead push, in the general direction of arrow 16, the plate into place due to the indentation 11 on the convex surface of the plate. Upon pushing the plate into the second void 12 hole with a tool such as a chisel, the plate may be held in place by the tension generated by the plate being pivoted on top of the framing member 1 and under the wallboard 2.

Figure 4:
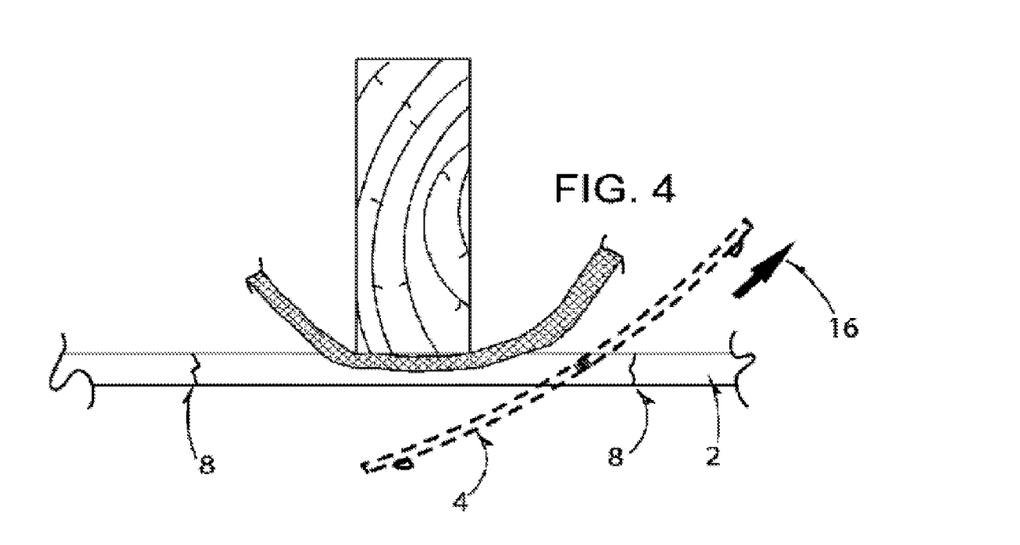
FIG. 4. is a side view of a plate showing the plate being installed, in accordance with embodiments of the present invention.

FIG. 4 is a side view of the plate 4 (the hash line indicates the plate is in motion, the arrow 16 indicates the direction of motion), as it is being installed indicating the initial placement well within one of the two voids holes 8, resting upon the inside surface of the wallboard 2, from which it will slide as it is being pushed up into place to cover the service lines, in accordance with embodiments of the present invention.

Figure 5:
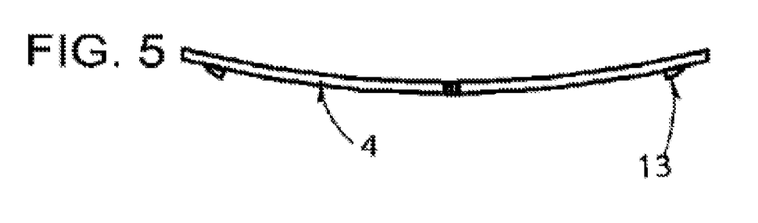
FIG. 5. is a lateral view of an edge of a plate, in accordance with embodiments of the present invention.

FIG. 5. is a lateral view of an edge of a plate showing a bend, in accordance with exemplary embodiments of the present invention. The bend may not be exaggerated because to do so may cause the plate to sit loosely in the hole and may fall out prior to placing the nails. The plate may comprise a number of raised features 13. These raised features 13 may comprise a notched surface that may catch a tool, such as a chisel, during installation. In some embodiments, raised surfaces 13 may not be higher than approximately the thickness of the material of the plate 4. In some embodiments, the surfaces 13 may be slightly less than the thickness of the plate 4, so as to not create a hole wherein a nail or other type of fastener may enter.

Figure 6:
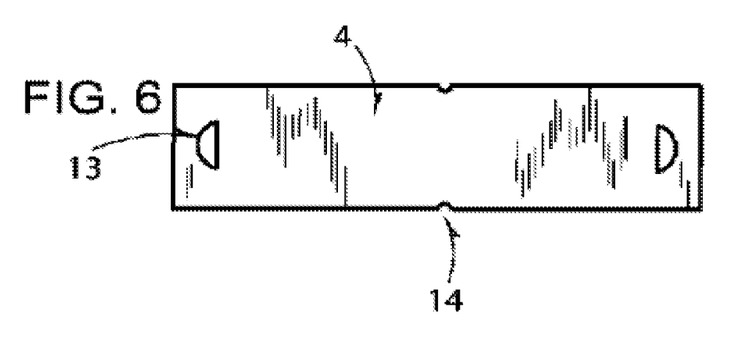
FIG. 6. is a view of a surface of a plate, in accordance with embodiments of the present invention.

FIG. 6. is a view of a convex surface of a plate in accordance with embodiments of the present invention. The plate 4 may comprise raised features 13 disposed on the surface of the plate 4. The plate 4 may comprise notches 14 on each end that may keep the plate 4 securely in place. In some embodiments, the notches 14 may prevent a nail or fastener from slipping past the plate 4 when setting the plate to the desired height. The plate 4 may slip up into the desired access opening hole and seat itself firmly in place. For additional security of the plate 4, it may also be nailed in place.

Figure 7:
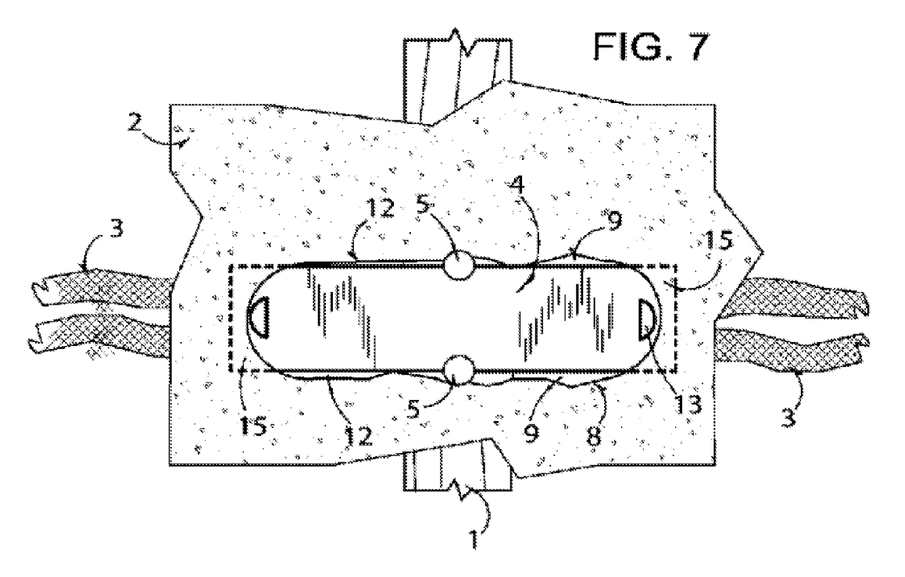
FIG. 7. is a similar view to FIG. 6. with the addition of surrounding native materials, in accordance with embodiments of the present invention.

FIG. 7. is the same view as FIG. 6. with the addition of a surrounding native materials as well as the service lines 3 passing over the framing member 1, in accordance with exemplary embodiments of the present invention. The plate 4 may be placed into an access hole 8 on one end and pushed into another access hole, for example, using a tool such as a chisel resting on one of the raised features 13. The plate may rest securely under a wallboard on each end 15 and may be held in place by the tension generated by the plate 4 being pivoted on top of a framing member and under the wallboard. In some embodiments, nails 5 may be in place and only a portion of the initial void holes 9, 12 may remain, a portion which may be filled and finished with a drywall compound.

FIG. 8. is a perspective view of a plate comprising raised features 13 and notches 14 in accordance with embodiments of the present disclosure.

In some embodiments, the plates described herein may comprise a non-metallic material, substantially non-metallic material, and/or the like. In some embodiments, the plate may comprise a superconductive material. In some embodiments, the plate may comprise graphite, graphene, silicone, intercalated graphite, germanium, fullerenes, silicon carbide, silicon-germanium, niobium-germanium, indium nitride, indium oxide, ceramic, lanthanum hexaboride, magnesium diboride, niobium monoxide, niobium nitride, yttrium borides, titanium nitride, and zirconium nitride, and/or the like. In some embodiments, the plate may comprise two or more layers, wherein at least one layer comprises a non-metallic material. In some embodiments, the plate may comprise both metallic and non-metallic portions. For example, in some embodiments, the plate may comprise a top half, a bottom half, a first lateral side, a second lateral side, a top surface, a bottom surface, one or more corner portions, and one or more central portions that may comprise non-metallic material.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

While the foregoing is directed to embodiments of the present invention, other and further embodiments of the invention may be devised without departing from the basic scope thereof. For example, although numerous embodiments having various features have been described herein, combinations of such various features in other combinations not discussed herein are contemplated within the scope of embodiments of the present invention.

What is claimed is:

1. A framing construction system comprising:
a cable protecting plate comprising non-metallic material, an upper convex surface, a lower concave surface, a first side edge, a second side edge, a first end, and a second end;
an opening provided in wallboard;
wherein the protecting plate is substantially rectangular in shape and inserted within the opening in the wallboard, with the lower concave surface being placed over a service line positioned across a structural support to prevent typical fasteners from penetrating the service line; and
wherein the protecting plate is pivoted around the structural support and the upper convex surface of the protecting plate and rests against an inside surface of the wallboard to secure by tension the protecting plate in the opening in the wallboard.

2. The framing construction system of claim 1, wherein the protecting plate comprises a superconductive material.

3. The framing construction system of claim 1, wherein the protecting plate comprises at least one of graphite and graphine.

4. The framing construction system of claim 1, wherein the protecting plate comprises silicone.

5. The framing construction system of claim 1, wherein the protecting plate comprises at least one of intercalated graphite, germanium, fullerenes, silicon carbide, silicon-germanium, niobium-germanium, indium nitride, indium oxide, ceramic, lanthanum hexaboride, magnesium diboride, niobium monoxide, niobium nitride, yttrium borides, titanium nitride, and zirconium nitride.

6. The framing construction system of claim 1, further comprising a slight bend extending along a length of the plate between the first end and the second end.

7. The framing construction system of claim 6 further comprising at least one protrusion on at least one of the upper convex and lower concave surfaces adequate for engaging a tool.

8. The framing construction system of claim 7, further comprising at least a notch centered on at least one of the first and second side edges for indicating and aiding nail placement.

9. The framing construction system of claim 7 wherein the protrusion further comprises a notched surface dimensioned so as not to create a hole wherein a nail or other fastener could easily enter.

10. The framing construction system of claim 6 wherein the concave surface of the protecting plate facilitates pivoting of the protecting plate around the structural support providing for easy insertion within the wall opening.

11. The framing construction system of claim 1 wherein the protecting plate inserted within the wall opening is set at a level just below the aggregate surface level of the wallboard, providing for a smooth wall surface when covered with drywall compound.

12. A framing construction system for protection of electrical wires comprising:
a plate comprising non-metallic material, the plate having a first end spaced apart from a second end, a concave surface, and an edge;
an opening formed in wallboard exposing a portion of a structural support and electrical wires;
wherein the protecting plate is pivoted around the structural support and the first and second ends of the protecting plate rest against an inside surface of the wallboard to secure the protecting plate in the opening in the wallboard; and
wherein the concave surface rests along an electrical wire extended over the structural support and inhibits penetration of a wall fastener by shielding the electrical wire from damage.

13. The framing construction system of claim 12, wherein the protecting plate comprises a superconductive material.

14. The framing construction system of claim 12, wherein the protecting plate comprises at least one of graphite and graphine.

15. The framing construction system of claim 12, wherein the protecting plate comprises silicone.

16. The framing construction system of claim 12, wherein the protecting plate comprises at least one of intercalated graphite, germanium, fullerenes, silicon carbide, silicon-germanium, niobium-germanium, indium nitride, indium oxide, ceramic, lanthanum hexaboride, magnesium diboride, niobium monoxide, niobium nitride, yttrium borides, titanium nitride, and zirconium nitride.

17. The framing construction system of claim 12 wherein the concave surface facilitates the insertion of the plate within an opening in a wall by pivoting around the structural stud.

18. The framing construction system of claim 17 wherein the concave surface is adaptable to extend from the first end over the structural stud to the second end of the plate.

19. The framing construction system of claim 17 further comprising;
at least one opening along the convex surface, the opening forming a raised feature along the convex surface; and
wherein the raised feature provides for engagement of a tool for insertion of the shield within the opening in the wall.

20. The framing construction system of claim 17 wherein the edge further comprises a dimension sufficient for aligning the plate within the wall opening and providing for a smooth wall surface when covered with wallboard compound.

* * * * *